(No Model.) 3 Sheets—Sheet 1.
J. R. CRAWFORD.
FISH TRAP.
No. 503,197. Patented Aug. 15, 1893.
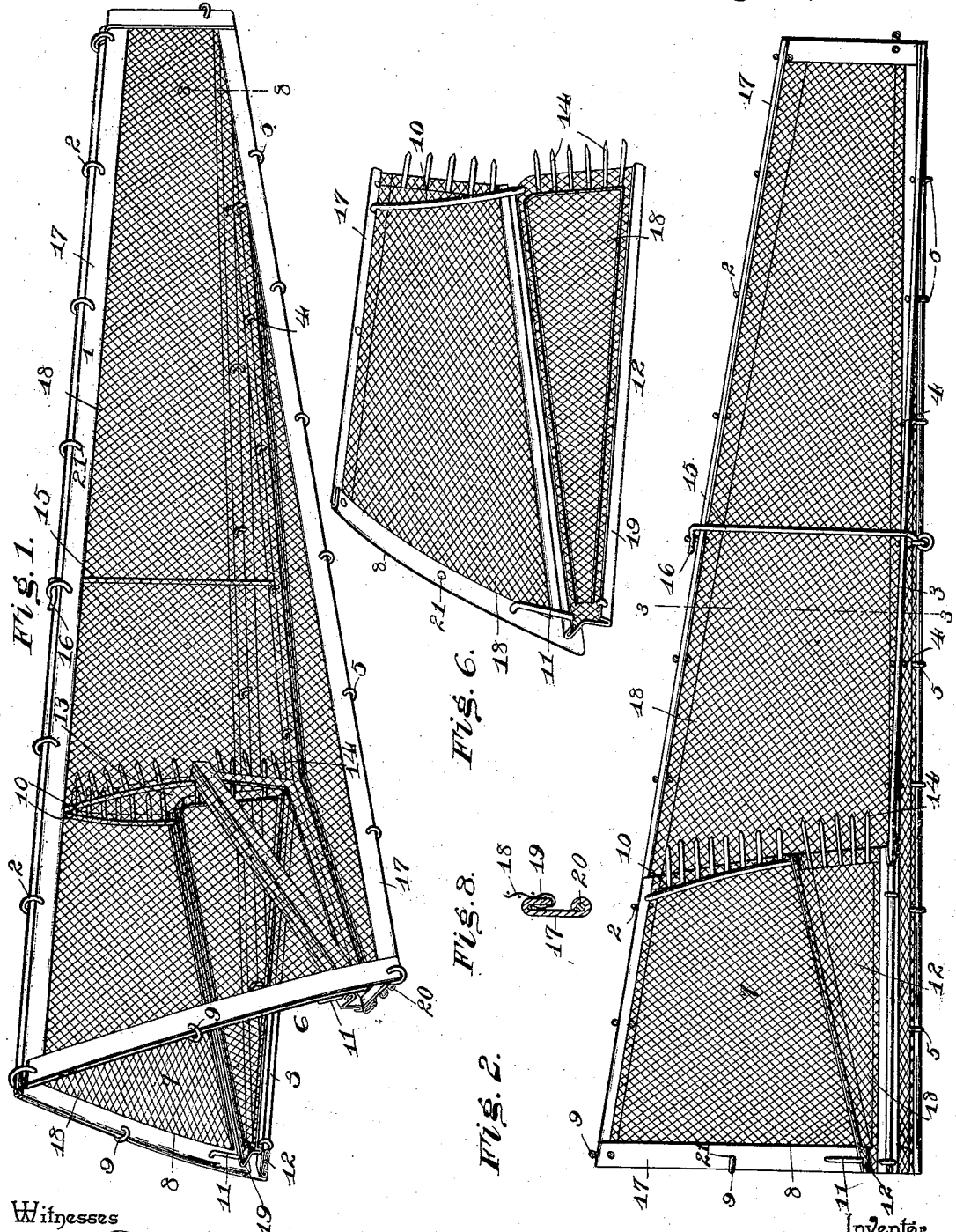
Witnesses
C. A. Ford.
Inventor
John R. Crawford
By his Attorneys,
C. A. Snow & Co.

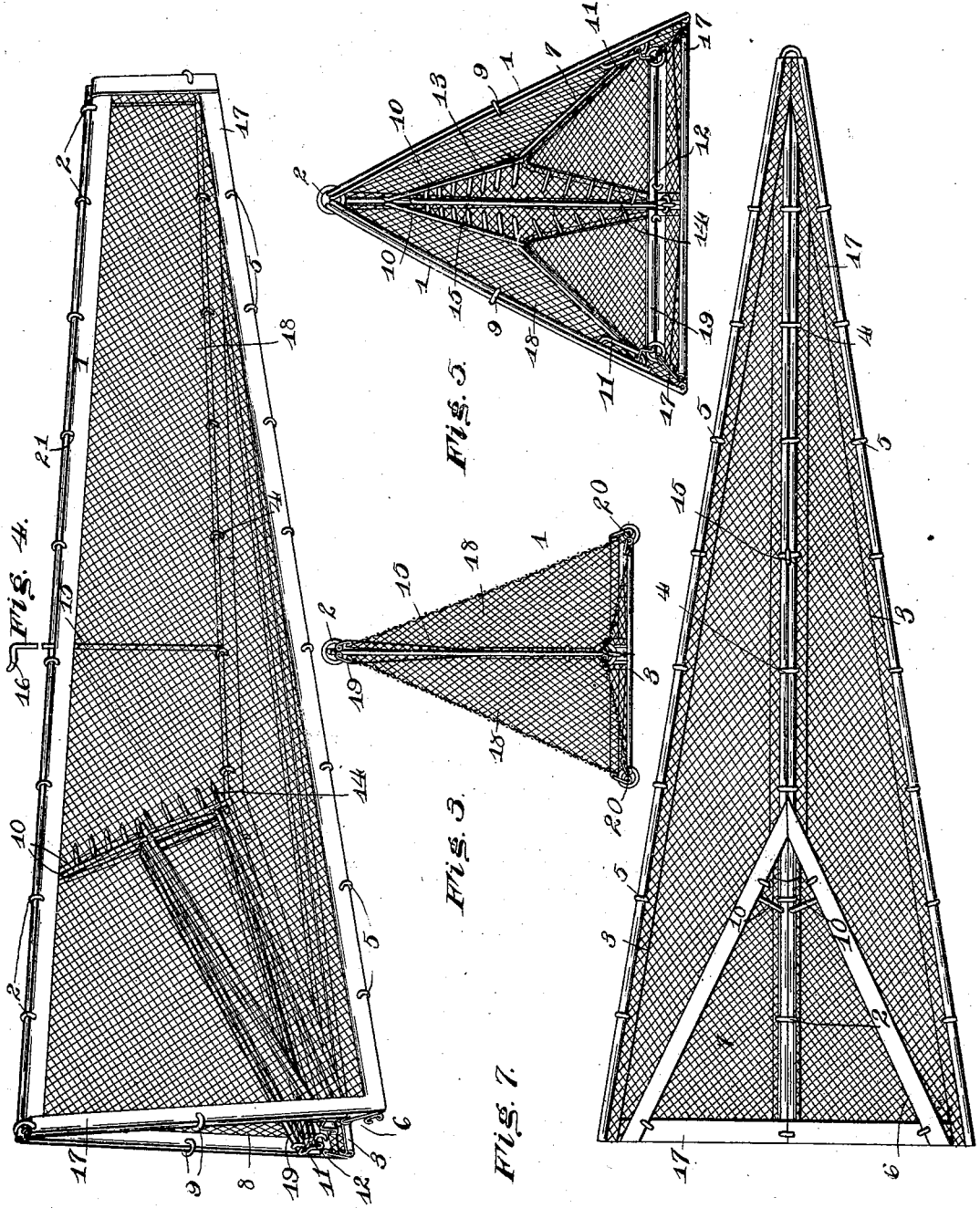

(No Model.) J. R. CRAWFORD. 3 Sheets—Sheet 3
FISH TRAP.
No. 503,197. Patented Aug. 15, 1893.
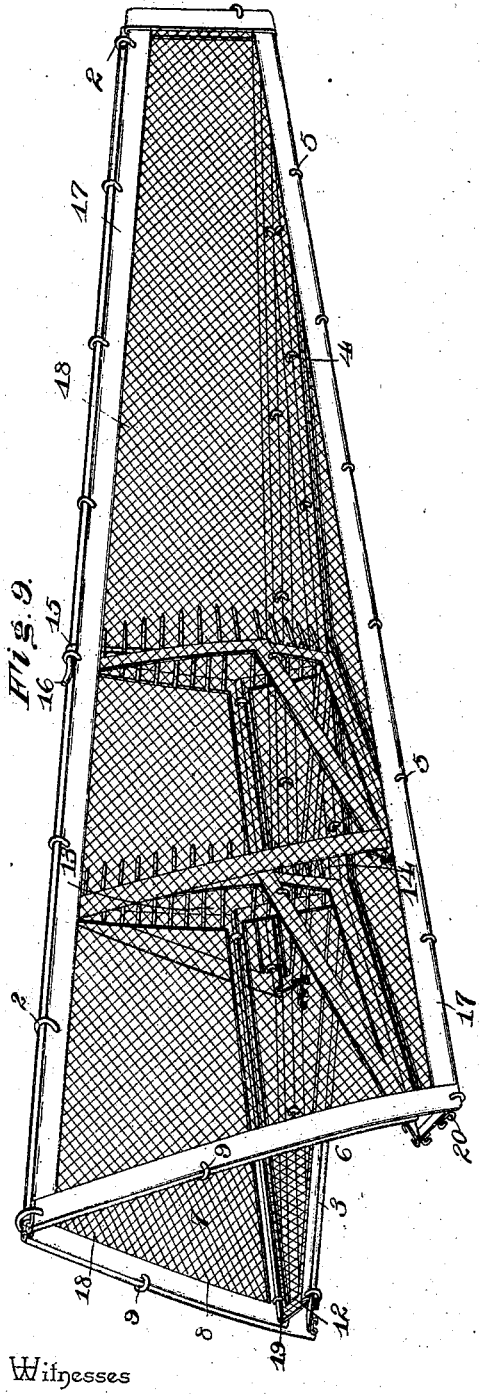
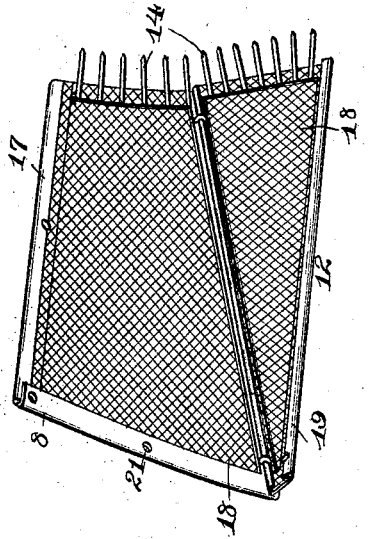
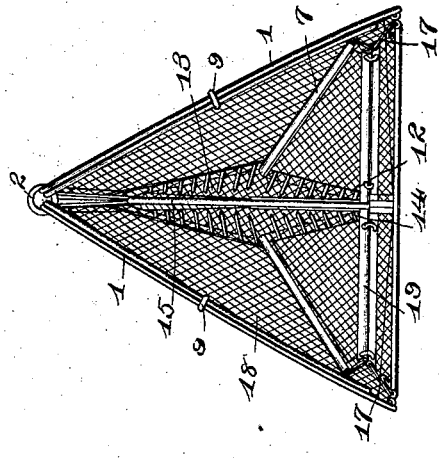
Witnesses
C. A. Ford.
Inventor
John R. Crawford.
By his Attorneys,
C. A. Snow & Co.

UNITED STATES PATENT OFFICE.

JOHN R. CRAWFORD, OF HEWITT, ALABAMA.

FISH-TRAP.

SPECIFICATION forming part of Letters Patent No. 503,197, dated August 15, 1893.

Application filed March 15, 1893. Serial No. 466,090. (No model.)

*To all whom it may concern:*

Be it known that I, JOHN R. CRAWFORD, a citizen of the United States, residing at Hewitt, in the county of Walker and State of Alabama, have invented a new and useful Fish-Trap, of which the following is a specification.

My invention relates to improvements in traps designed for the capture of fish and fur-bearing game, the objects in view being to provide a device of this class which can be folded into a portable form; to provide improved means for securing the edges of the screen and to provide improved devices for preventing the escape of the captured fish or game.

Further objects of my invention will appear in the following description, and the novel features thereof will be particularly pointed out in the appended claims.

In the drawings—Figure 1 is a perspective view of a trap embodying my invention. Fig. 2 is a longitudinal central section of the same. Fig. 3 is a transverse section upon the line 3—3 of Fig. 2. Fig. 4 is a perspective view of the trap folded for transportation. Fig. 5 is a front view showing the entrance or pocket. Fig. 6 is a detail perspective view of one of the foldable sides of the pocket, detached. Fig. 7 is a bottom plan view of the trap. Fig. 8 is a section on line 8—8 of Fig. 1. Fig. 9 is a perspective view of a trap embodying my invention in which duplicate pockets are employed; and in which the V-shaped flaps are hinged to the wings. Fig. 10 is a front view of the same. Fig. 11 is a detail perspective view of one of the foldable sides of a pocket, in which the sections or parts thereof are hinged together.

Similar numerals of reference indicate corresponding parts in all the figures.

1 designates the side walls of my improved trap, which taper in width from their front to their rear ends, and are united at their upper edges to form a hinged joint by means of rings 2. The floor of the trap is composed of duplicate sections or members 3, whose inner or adjacent edges are hinged together by means of the rings 4, and whose outer edges are hinged to the lower edges of the side walls by means of the rings 5. When the device is folded the inner edges of the floor sections rise vertically so as to occupy positions in contact between the side walls. The floor sections are tapered in width toward their rear ends to correspond with the formation of the side walls and fit snugly in the space between the lower edges of said walls, and the front ends of said floor sections are tapered so that the inner edges of the tapered front portions diverge toward the front to form a V-shaped interval or space 6, in plan.

The pocket 7, at the front end of the trap, is formed by the rearwardly converging wings 8, whose front edges are approximately equal in length to the front edges of the side walls, and are hinged thereto by means of the rings 9, and which taper in width toward their rear ends to form a V-shaped interval between the lower edges of said wings and the sub-adjacent inner edges of the tapered front ends of the floor sections. The upper edges of said wings are hinged to the upper edges of the side walls by means of the rings 2, which connect the upper edges of said side walls. The wings are further provided at their rear reduced ends with guide-rods 10, which are parallel respectively with the wings by which they are carried, and are provided at their front ends with corresponding keepers or guides 11.

Interposed between the adjacent edges of the wings and the floor sections are the V-shaped flaps 12, which are hinged at their lower edges to the inner divergent edges of the floor sections and are slidably mounted at their upper edges upon said guide-rods.

The rear edges of the wings and connected flaps are so separated as to form an entrance opening 13, and the rear ends of said wings and flaps are provided with barbs 14, which extend rearwardly to prevent the escape of captured fish or game.

Connected at its lower end to an intermediate point of the connected inner edges of the floor sections is an adjusting rod 15, whose upper end extends through the interval between the upper edges of the side walls, and is provided with a detent 16 to engage one of the rings 2 to lock the trap in its operative position.

To fold the improved trap the detent at the upper end of the adjusting rod is disengaged from the ring 2 and is drawn vertically between the adjacent upper edges of the side walls, as indicated in Fig. 4, thereby elevating the inner edges of the floor sections until they are arranged in planes parallel with and between the side walls, and the slidable flaps which are carried by the wings are elevated to occupy positions between said wings.

The various members composing my improved trap, as the side walls, the floor sections, wings, &c., consist each of a metallic frame 17, within which is arranged a screen 18. The frame, in the construction illustrated, consists of a sheet metal strip, whose inner edge or edge adjacent to the screen is folded upon itself to form a clip 19, in which is fitted and secured the edge of said screen, and whose outer edge is folded round a stiffening rod 20, to form a bead. The connecting rings by which the members of the trap are hinged together, engage perforations 21, which are formed in the frames and preferably extend through the double or clip portion thereof, in order to inclose the stiffening rod. The portions of the frames of the side walls which form the boundaries for the mouth of the pocket at the front end of the trap, are bulged and rounded outward at their centers to increase the area of the said mouth or opening, and when the trap is folded the said parts assume positions parallel with each other.

In capturing fur-bearing animals, I have noticed that their escape from the trap is prevented by the automatic closing of the entrance opening upon the depression by such animal of the inner edges of the floor sections, such inner edges being normally elevated slightly above the plane of the lower edges of the side walls in order to allow for such depression. This closing of the entrance opening does not interfere with the subsequent entrance of other animals for the reason that the rear edges of the wings are readily separated by the lateral pressure caused by an entering animal.

In Fig. 9 I have shown a trap provided with duplicate pockets, which are identical in construction; either one or two may be employed. Also in Figs. 9, 10 and 11 I have illustrated a slightly modified manner of connecting the sections of the sides of the pocket, consisting in hinging the same whereby the flaps fold against the wings. Either the sliding or hinge joint may be employed, but under ordinary circumstances the hinge-joint is preferable, for the reason that it is more substantial and less liable to allow the parts to become disarranged.

Having described my invention, what I claim, and desire to secure by Letters Patent, is—

1. In a trap for fish and other water game, the side walls foldably connected at their upper edges, duplicate floor-sections foldably connected together at their inner edges and to the side walls at their outer edges, and means for preventing the egress of the game, substantially as specified.

2. In a trap for fish and other water game, the side walls hinged or foldably connected at their upper edges, the duplicate floor sections connected at their adjacent edges to each other and at their outer edges to said side walls, and a re-entering pocket arranged between the front ends of the side walls, substantially as specified.

3. In a trap for fish and other water game, the side walls loosely connected at their upper edges, the floor sections connected to each other and to the lower edges of said side walls and elevated at their inner edges above the plane of the lower edges of said side walls, and a re-entering pocket between the front ends of the side walls, substantially as specified.

4. In a trap for fish and other water game, the combination of the side walls hinged together at their upper edges, the duplicate floor sections hinged together and to the lower edges of said side walls, the duplicate wings arranged between the front ends of the side walls to form a pocket, and flaps foldably connected to said wings and at their lower edges to the sub-adjacent edges of the floor sections, substantially as specified.

5. In a trap for fish and other water game, the combination of the side walls hinged together at their upper edges, the floor sections hinged together and to the lower edges of said side walls, and provided with tapered front ends, the wings arranged between the front ends of the side walls, hinged at their front edges and at their upper edges to said side walls, and provided with guide-rods, and flaps arranged in the intervals between the lower edges of the wings and the divergent edges of the tapered front ends of the floor sections, mounted slidably upon said guide-rods, and hinged to the edges of the floor sections, substantially as specified.

6. In a trap for fish and other water game, the combination, with side walls hinged together at their upper edges, floor sections hinged together and to the lower edges of said side walls, a folding pocket arranged between the front ends of the side walls, and the adjusting rod connected at its lower end to the inner edges of the floor sections, extending vertically between the edges of the said walls and provided with a detent, substantially as specified.

7. In a trap for fish and other water game, the combination, with side walls having their upper edges connected together, a sectional floor having its center arranged above the plane of the lower edges of the side walls, and adapted to be depressed by a captured animal, and a pocket comprising wings and connected flaps, whose lower edges are connected to said floor, whereby, when the latter is depressed the opening between the rear ends of the wings and flaps is contracted, substantially as specified.

8. In a trap for fish and other water game, the side walls, the floor sections, the wings arranged between the front ends of the side walls, and the flaps connecting the lower edges of said wings to the floor sections, combined with barbs arranged upon the rear edges of said wings and flaps and projecting rearward, substantially as specified.

9. In a trap for fish and other water game, the combination of the side walls, floor sections, and foldable pocket, with the rings fitting in corresponding perforations in the adjacent edges of such parts or members to hinge the same together, substantially as specified.

10. A trap for fish and other water game, composed of foldable sections or members hinged together at their meeting edges and consisting of the metallic frame of sheet metal, whose inner edges are folded to form clips and whose outer edges are provided with stiffening rods, and a screen fitting and secured at its edges in said clips, substantially as specified.

In testimony that I claim the foregoing as my own I have hereto affixed my signature in the presence of two witnesses.

JOHN R. CRAWFORD.

Witnesses:
W. W. JONES,
M. G. SHOOTER.